United States Patent Office 3,448,774
Patented June 10, 1969

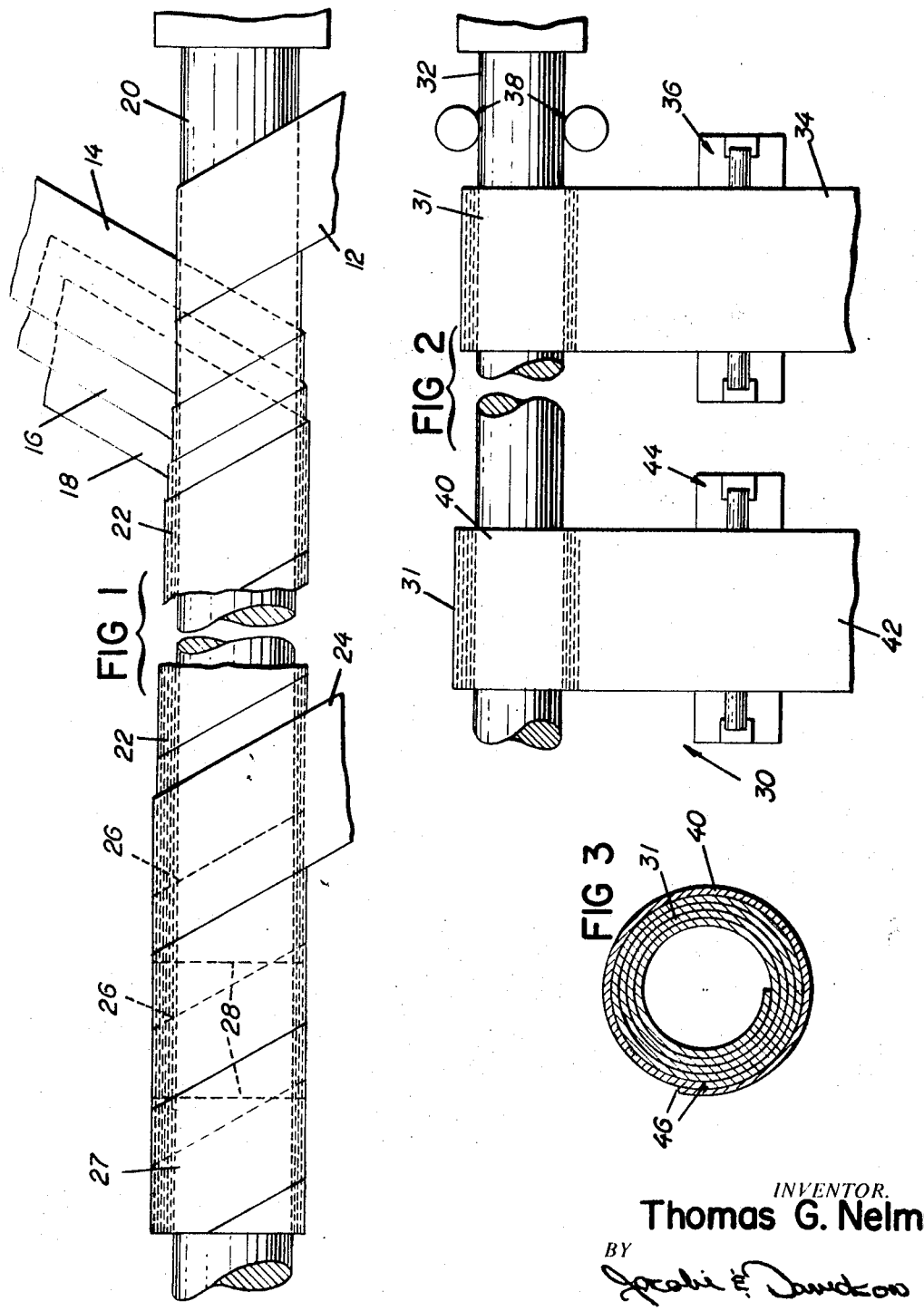

3,448,774
CENTER CORE FOR ROLLS OF PRESSURE-SENSITIVE ADHESIVE TAPE AND METHODS OF MAKING SAME
Thomas G. Nelms, 15 Summerfield Road, London W. 5, England
Continuation of application Ser. No. 403,780, Oct. 14, 1964. This application Jan. 2, 1968, Ser. No. 695,290
Claims priority, application Great Britain, Oct. 18, 1963, 41,328/63
Int. Cl. F16l 9/16; B65h 81/04
U.S. Cl. 138—144             11 Claims This application is a continuation of application Ser. No. 403,780 filed Oct. 14, 1964, now abandoned.

This invention relates to center cores upon which continuous strips of pressure-sensitive adhesive tape including tapes for surgical purposes can be convolutely wound for selective dispensing of the same, and to methods of making such cores. More particularly, the invention relates to such cores which have a fibrous material base, and yet which permit the entire length of pressure-sensitive tape wound thereupon to be utilized—i.e. without waste of the inner end portion directly in contact with the core.

Rolls of pressure-sensitive adhesive tape convolutely wound upon a core have been commercially available for many years and are presently sold in great quantities. Conventionally, the center core is in the form of a disposable ring or tube formed by helically or convolutely winding and bonding layers of paper. The inner end portion of the pressure-sensitive tape is usually in direct contact with the paper and strongly bonded thereto. Thus with cores of this type, the innermost turn of the tape is normally wasted at the end of the dispensing procedure because of the inability to effectively separate it from the core. While this may seem somewhat insignificant from the standpoint of the user of small quantities of pressure-sensitive adhesive tape, such waste is particularly disadvantageous in large scale commercial use of pressure-sensitive adhesive tapes especially in continuous operations where tape from a new supply must be immediately substituted on depletion of a roll.

Various methods have been suggested heretofore in an attempt to overcome this problem. For example, the fibrous core has been replaced by solid plastic or metal cores wherein the cohesive force of the core material is substantially greater than the adhesive force between the pressure-sensitive adhesive tape and the core material. However, cores of this type are inherently relatively expensive, rendering such cores commercially unsuitable in most instances.

Attempts have also been made to coat the fibrous core with a material, the surface of which has been treated to decrease its affinity for the pressure-sensitive adhesive tape. However, the coating materials, in addition to being relatively expensive, have been difficult to bond to the fibrous core in such a manner as to preclude withdrawal therefrom on unwinding of the tape.

A more recent suggestion in the prior art attempts to solve this problem by helically winding a first, relatively narrow strip of a delamination-resistant sheet material onto the surface of the fibrous core, followed by the adherence to the narrower strip of a wider strip of the delamination-resistant sheet material having a surface to which normally tacky pressure-sensitive adhesive tapes may be temporarily bonded and from which such tapes may be subsequently removed. The wider strip is helically wound with the edges of the same abuttingly juxtaposed over the narrower strip. The adhesive material used to bond such wider strips to the fibrous ring tends to shrink the sheet material utilized, thereby separating the juxtaposed edges causing gaps which may or may not be spanned by the narrower strips therebelow. Moreover, such a procedure is obviously complex and therefore relatively expensive rendering the same unfeasible for most commercial applications.

A further disadvantage of cores formed according to the various prior art teachings, is the incidence of "dog ears," that is, the small triangular portions of the outer ply of the core which protrude at the point where the seam produced by winding is slit or sliced to form a plurality of separate cores from a single tubular strip. These defects are caused by a poor adhesive bond between the outer and penultimate ply of the core and have resulted in a large quantity of commercially unacceptable products which have been, of necessity, rejected heretofore.

A primary object of this invention is the provision of a fibrous base center core upon which a continuous strip of pressure-sensitive adhesive tape can be convolutely wound for selected dispensing thereof which core is free from the foregoing and other disadvantages.

Further in this general regard, it is an object of the instant invention to provide cores of the type described which are sturdy and durable in construction, reliable and efficient in operation, and relatively simple and inexpensive to manufacture and to utilize.

Still another object of this invention is the provision of center cores for rolls of pressure-sensitive adhesive tape utilizing the inexpensive fibrous material of the past to form an annular ring, but covering the same with a cellulosic film adhesively bonded to the exterior surface of the ring in such a manner as to form a barrier between the ring and the tape to be wound thereon.

Yet another object of this invention is to provide a core capable of dispensing the entire quantity of pressure-sensitive adhesive tape wound thereon, which core utilizes a single covering layer uniquely bonded to a fibrous ring to entirely coat the same while provided a smooth surface to which the pressure-sensitive adhesive tape will adhere during the rolling operation, but from which the tape will be readily removed during the dispensing operation.

A still further object of the instant invention is to provide a center core on which may be wound a pressure-sensitive adhesive tape, the core being free from "dog ears" and other such defects, while utilizing relatively inexpensive materials such as cellophane and emulsion adhesives to form a surface coating on the fibrous ring which is resistant to the shear forces exerted by the pressure-sensitive adhesive tape being rolled, but from which the tape can be readily stripped during dispensing because of a bond, weak in tension, between the film and the adhesive coating on the tape.

An additional object of this invention is the provision of various methods of manufacturing cores of the type described, which are simple and inexpensive to practice, utilizing a minimum of materials, and which result in a product having the highly desirable characteristics mentioned hereinbefore.

Other and further objects reside in the combination of elements, arrangement of parts, features of construction, and manipulative steps set forth hereinafter.

Still other objects will in part be obvious and in part be pointed out as the description of the invention proceeds and as shown in the accompanying drawings wherein:

FIGURE 1 is a plan view of a helical winding process for forming one embodiment of the center cores of the instant invention, parts being broken away for illustrative clarity and convenience;

FIGURE 2 is a plan view, similarly broken away, schematically showing the manufacturing of another embodiment of center cores for rolls of pressure-sensitive adhesive tape in accordance with the instant invention by a convolute winding process; and FIGURE 3 is an enlarged end elevational view of a core made according to the method of FIGURE 2.

Like reference characters refer to like parts throughout the several views of the drawings.

Referring now to the drawings and more particularly to FIGURE 1, a helical winding process for forming cores according to one embodiment of this invention is designated generally by the reference numeral 10 and comprises basically the helical winding of one or more plies 12, 14, 16, 18 in overlapping relationship upon a mandrel 20, the mandrel 20 being stationary and the fibrous ring 22 formed by the plurality of plies of fibrous material being rotated by any conventional driving means such as belts or the like (not shown). It is to be understood that each of the plies 12–18 may be formed from any of the well-known fibrous materials used heretofore for this purpose, a preferred ring 22 being provided by plies including an inner and an outer layer of paper and a plurality of intermediate layers of wood pulp board. Further, any conventional inexpensive adhesive such as precooked dextrin or the like dissolved in water may be utilized to bond the plies 12–18 together to form the fibrous ring 22.

According to the instant invention concept, the conventional helical winding process is modified by applying a cellulosic film 24, for example, a film of unsized transparent cellulose, preferably cellophane, onto the tubular fibrous ring 22, helically winding the cellophane in a manner similar to the plies 12–18 with the adjacent edges of the film 24 being overlapped as shown at 26. An adhesive material, preferably an emulsion adhesive such as Resindex 764, manufactured by Starch Products, Ltd., and consisting essentially of a copolymer of vinyl acetate and ethyl acrylate with a plasticizer therefor such as dibutyl phthalate, is interposed between the fibrous ring 22 and the film 24, preferably by applying a coating of the same to the undersurface of the film. Such adhesives have a characteristic of firmly bonding the film 24 to the fibrous ring 22 with a peel strength exceeding the peel strength between the film 24 and the pressure-sensitive adhesive tape (not shown) subsequently wound thereon. Resindex 764 has good initial tack and remains tacky during the normal life of the adhesive coating. This material has a viscosity of 2600–2900 centipoises, a particle size of from 1–2 microns, a concentration of 63 percent, a pH of 5.5 to 6.0 and a specific gravity of 1.06 to 1.08. It is to be understood that although this emulsion adhesive is set forth as illustrative and preferred, other comparable materials may be readily substituted therefor, the only requirement being the formation of a strong bond between the film 24 and the fibrous ring 22 and a comparably strong bond between the overlapped portions 26 of the film 24 to provide a continuous coating over the fibrous ring 22 from a single adhesive.

The covered fibrous ring 27 may be helically wound to a width exceding the width of the tape to be subsequently carried thereby with the same being severed perpendicularly to the axis of the ring 27 such as along the dotted lines 28 to form a plurality of separate cores each having a width substantiallly equivalent to that of the tape (not shown).

An alternate method of forming cores in accordance with this invention is shown in FIGURE 2 at 30 wherein a fibrous ring 31 is formed at a first position on a mandrel 32 by convolutely winding in any conventional manner an elongated strip 34 of the fibrous material. An adhesive material such as the dextrin mentioned hereinabove is applied to the underside of the strip 34 by any conventional coating means schematically shown at 36. After cutting the strip 36 adjacent the mandrel 32, the fibrous ring 31 is transferred by means schematically shown at 38 to a scond position on the mandrel 32 wherein a single turn 40 of a strip 4 of cellulosic material such as cellophane or the like is convolutely wound thereon with an adhesive such as the Resindex 764 mentioned hereinbefore interposed therebetween by application of a coating of the same to the underside of the strip 42 by conventional coating means 44. The ends of the single turn 40 of cellulosic film 42 are overlapped as seen at 46 in FIGURE 3 to insure a continuous covering of the fibrous ring 31.

By overlapping the juxtaposed portions of the film, either the edges of the film in the helical winding method 10 of FIGURE 1, or the ends of the film in the convolute winding method 30 of FIGURE 2, a smooth, even outer surface for reception of the pressure-sensitive adhesive tape is provided while the ends of the outer paper ply are held in place thus reducing the incidence of "dog ears" at the lateral edges of the core. Moreover, the overlapped portions preclude gapping on shrinking of the film by the adhesive, the desideratum being effected with the use of only a single covering sheet as compared with the two separate strips utilized according to one prior art procedure described hereinabove. Such gaps in the covering would reseult in poor bonding of the same to the fibrous ring and undesirable adherence of the first turn of the pressure-sensitive adhesive tape to the fibrous ring through the gaps.

Since the film utilized to cover the outer ply of the fibrous ring is of a cellulosic material, the tacky emulsion adhesive utilized for securing the same to the ring is equally satisfactory for securing overlapping portions of the film to itself, thereby, once again, precluding the necessity of more than one covering layer or more than one adhesive.

It will now be seen that there is herein provided an improved core for rolls of pressure-sensitive adhesive tape and improved methods for manufacturing the same, which satisfy all the objectives of the instant invention, and others, including many advantages of great practical utility, and commercial importance.

Since many embodiments may be made of the instant inventive concepts and since many modifications may be made of the embodiments hereinbefore shown and described, it is to be understood that all matter herein is to be interpreted merely as illustrative and not in a limiting sense. Accordingly,

What is claimed is:

1. As an article of manufacture, a center core upon which a continuous strip of pressure-sensitive adhesive tape is convolutely wound for selective dispensing thereof, said core comprising an annular fibrous ring having at least one seam extending along its exterior surface and a single, at least substantially nonfibrous, cellulosic film, adhesive material adhesively binding said film to the exterior surface of said ring overlying said seam, said film and said adhesive material forming the sole barrier between said ring and said tape, the adhesive bond of said adhesive material, between said film and said ring having a peel strength exceeding that of the adhesive bond between said pressure-sensitive tape and said film whereby said tape may be dispensed without separating said film from said ring.

2. An article of manufacture as defined in claim 1 wherein said film is unsized transparent cellulose.

3. An article of manufacture as defined in claim 1 wherein said film is cellophane.

4. An article of manufacture as defined in claim 1 wherein said film is bonded to said ring by tacky emulsion adhesive.

5. An article of manufacture as defined in claim 1 wherein said film is wound upon said ring with juxtaposed portions of said film in overlapping relationship to define a continuous layer between said ring and said pressure-sensitive adhesive tape to be wound thereon.

6. An article of manufacture as defined in claim 5 wherein said film is cellophane and said film is bonded to said ring and to itself where it overlaps by a tacky emulsion adhesive consisting essentially of a copolymer of vinyl acetate and ethyl acrylate with a plasticizer therefor.

7. An article of manufacture as defined in claim 1 wherein said film is helically wound upon said ring with the edges of said film overlapping one another.

8. An article of manufacture as defined in claim 1 wherein one turn of said film is convolutely wound upon said ring with the ends of said twin overlapping one another.

9. An article of manufacture as defined in claim 1 wherein said ring is formed of a plurality of plies.

10. An article of manufacture as defined in claim 9 wherein said fibrous material in said plies includes an inner and an outer layer of paper and a plurality of intermediate layers of wood pulp board.

11. An article of manufacture as defined in claim 10 wherein said film is unsized transparent cellulose.

References Cited

UNITED STATES PATENTS

| | | | |
|---|---|---|---|
| 2,042,644 | 6/1936 | Walter | 138—128 |
| 2,181,035 | 11/1939 | White | 138—144 |
| 2,800,145 | 7/1957 | Peierls | 138—128 X |
| 3,115,246 | 12/1963 | Wicklund | 161—167 X |

LAVERNE D. GEIGER, *Primary Examiner.*

B. KILE, *Assistant Examiner.*

U.S. Cl. X.R.

206—59

UNITED STATES PATENT OFFICE
CERTIFICATE OF CORRECTION

Patent No. 3,448,774                      June 10, 1969

Thomas G. Nelms

It is certified that error appears in the above identified patent and that said Letters Patent are hereby corrected as shown below:

In the heading to the printed specification, lines 5 and 6, "15 Summerfield Road, London W. 5, England" should read -- London, England, assignor to Rolex Paper Company Limited, London, England, a British company --.

Signed and sealed this 3rd day of March 1970.

(SEAL)
Attest:

Edward M. Fletcher, Jr.                  WILLIAM E. SCHUYLER, JR.
Attesting Officer                         Commissioner of Patents